(12) United States Patent
Mozar

(10) Patent No.: US 7,911,087 B2
(45) Date of Patent: Mar. 22, 2011

(54) SWITCHING SYSTEM

(76) Inventor: Stefan Mozar, Glenwood (AU)

( * ) Notice: Subject to any disclaimer, the term of this patent is extended or adjusted under 35 U.S.C. 154(b) by 108 days.

(21) Appl. No.: 12/289,813

(22) Filed: Nov. 5, 2008

(65) Prior Publication Data

US 2009/0134715 A1 May 28, 2009

Related U.S. Application Data

(60) Provisional application No. 60/985,582, filed on Nov. 5, 2007.

(51) Int. Cl.
*H01H 35/14* (2006.01)
(52) U.S. Cl. ........................................................ 307/117
(58) Field of Classification Search ................... 307/117
See application file for complete search history.

(56) References Cited

U.S. PATENT DOCUMENTS 7,720,513 B2 * 5/2010 Enenkl .......................... 455/572

OTHER PUBLICATIONS

S. Mozar, "Intelligent standby concept", Consumer Electronics, IEEE Transactions on vol. 46, Issue 1, Feb. 2000 pp. 179-182.

* cited by examiner

*Primary Examiner* — Robert L. Deberadinis
(74) *Attorney, Agent, or Firm* — Harness, Dickey & Pierce, P.L.C.

(57) ABSTRACT

The switching system for reducing standby power consumed by an electrical device includes a remote control device configured to selectively emit a radio frequency signal and a switching apparatus in electrical communication with a power supply and the electrical device. The switching apparatus includes a passive radio frequency receiver for receiving the emitted radio frequency signal and a switch. The passive radio frequency receiver converts the received radio frequency signal into electrical power. The switch is actuable, in response to the electrical power generated by the passive radio frequency receiver, from an inactive mode. The switch substantially restricts the electrical device consuming standby power from the power supply, to an active mode. The switch allows the electrical device to consume power from the power supply.

13 Claims, 6 Drawing Sheets

SWITCHING SYSTEM

This application claims priority on Provisional Application No. 60/985,582 filed on Nov. 5, 2007; the entire contents of which are incorporated herein by reference.

TECHNICAL FIELD DEVICE

The present invention relates to a switching system for reducing standby power of an electrical device.

BACKGROUND ART

During periods of non-use, particular electrical devices are maintained in a standby mode, wherein the electrical device consumes standby power. It has been estimated that about ten percent of the average amount of household power consumed in Australia is due to electrical devices consuming standby power.

Therefore there exists a need for an apparatus which reduces standby power consumed by an electrical item during periods of non-use.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

DISCLOSURE OF INVENTION

In a first broad form, there is provided a switching system for reducing standby power consumed by an electrical device, wherein the switching system comprises:
  a remote control device configured to selectively emit a radio frequency signal;
  a switching apparatus in electrical communication with a power supply and the electrical device, wherein the switching apparatus comprises:
    a passive radio frequency receiver for receiving the emitted radio frequency signal, wherein the passive radio frequency receiver converts the received radio frequency signal into electrical power; and
    a switch actuable, in response to the electrical power generated by the passive radio frequency receiver, from an inactive mode, wherein the switch substantially restricts the electrical device consuming standby power from the power supply, to an active mode, wherein the switch allows the electrical device to consume power from the power supply.

In one form, in response to receiving the radio frequency signal whilst the switch is in the active mode, the switch is actuated to the inactive mode.

In another form, the switching apparatus is in electrical communication with a plurality of electrical devices and wherein the switching apparatus comprises a plurality of switches, wherein when the remote control device emits the radio frequency signal, one of the plurality of switches is actuated from the inactive mode to the active mode in order to provide power to one of the plurality of electrical devices.

In one embodiment, the radio frequency signal emitted by the remote control device is indicative of one of the plurality of the switches to be actuated, wherein the switching apparatus comprises a decoding circuit configured to decode the received radio frequency signal to determine and actuate the indicated one of the plurality of the switches.

In an optional form, the remote control device emits a plurality of radio frequency signals, each radio signal having a unique frequency, wherein the switching apparatus comprises a plurality of passive radio frequency receivers, wherein each passive radio frequency receiver is responsive to a respective frequency in order to actuate the associated switch.

Optionally, the switching apparatus comprises a memory to store a current state of the one or more switches, wherein the current switch state is retrieved from the memory prior to actuating the respective switch to the inactive or active mode, and after actuating the respective switch, updating the current state for the respective switch.

In one form, the switch is a semiconductor device.

In another form, the switch is a TRIAC.

In an alternate form, the switch is electro-mechanical switch.

In one embodiment, the electromechanical switch is a relay switch.

In another form, the switching apparatus has a housing which is receivable within at least one of:
  a general power outlet (GPO);
  a power distribution board;
  a portion of the electrical device.

In one embodiment, the switching apparatus comprises a filter circuit to filter received radio frequency signals unintended for the switching system, wherein the filter circuit compares the decoded radio frequency signal against a predefined code to determine whether received radio frequency signal is intended for the switching system.

Optionally, the switching apparatus comprises a timer unit in electrical communication with the passive radio frequency receiver and the switch, wherein the timer unit is actuable upon receipt of an electrical signal received by the passive radio frequency receiver from the remote control device such that actuation of the timer unit restricts actuation of the switch for a period of time.

In an optional form, the remote control device comprises a keypad in order to select the period of time for the timer unit to restrict actuation of the switch, wherein the emitted radio frequency signal is indicative of the period of time for the timer unit to restrict actuation of the switching apparatus.

BRIEF DESCRIPTION OF FIGURES

The example embodiment of the present invention should become apparent from the following description, which is given by way of example only, of a preferred but non-limiting embodiment, described in connection with the accompanying figures.

MODES FOR CARRYING OUT THE INVENTION

Figure 1:
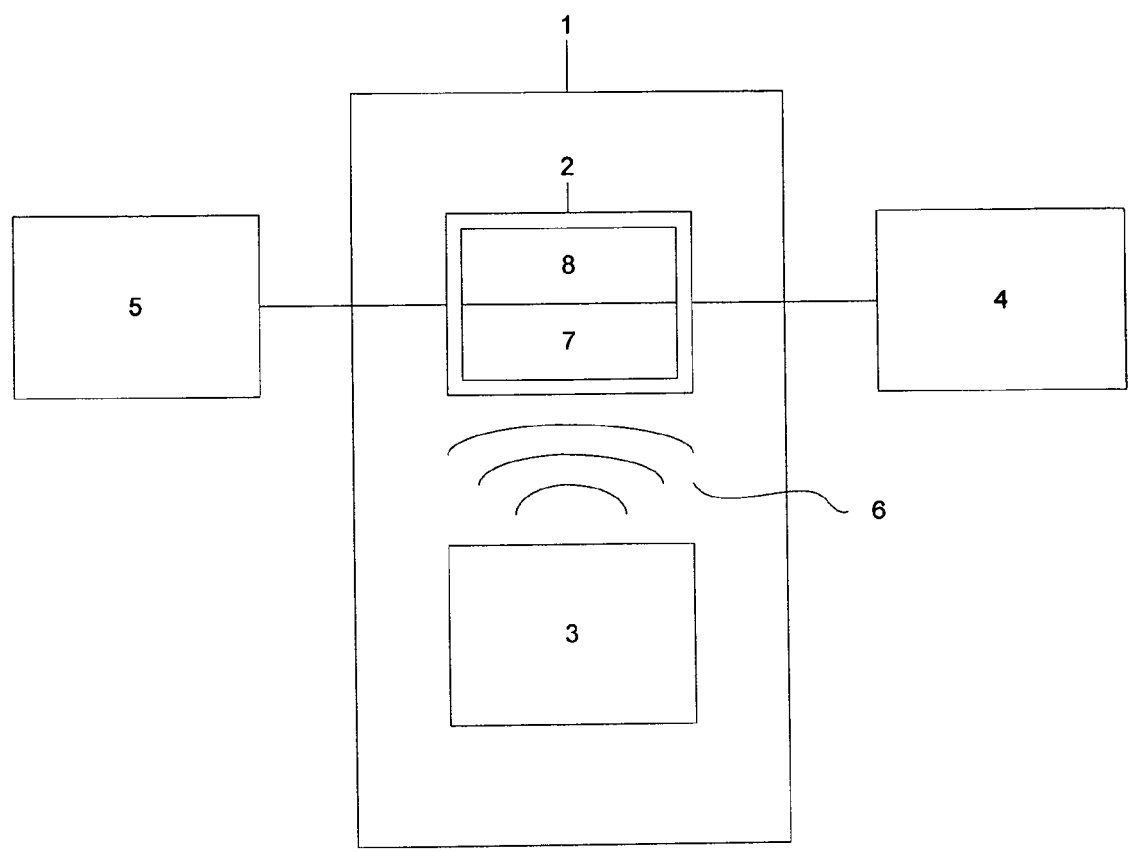
FIG. 1 illustrates a block diagram representing a system comprising a switching apparatus.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

Referring to figure one there is shown a switching system 1 for reducing standby power consumed by an electrical device 4.

In particular, the switching system 1 comprises a remote control device 3 and a switching apparatus 2 comprising a passive radio frequency receiver 7 and a switch 8. The switching apparatus 2 is in electrical communication with a power supply 5 and the electrical device 4. The remote control device 3 is configured to selectively emit a radio frequency signal 6. The passive radio frequency receiver 7 is configured to receive the emitted radio frequency signal 6 and convert the received radio frequency signal 6 into electrical power. The switch 8 is actuable in response to the electrical power generated by the passive radio frequency receiver 7, from an inactive mode, wherein the switch substantially restricts the electrical device 4 consuming standby power from the power supply, to an active mode, wherein the switch allows the electrical device 4 to consume power from the power supply 5.

By rectifying the radio frequency signal 6 to power the actuation of the switch 8, the electrical device 4 is restricted from consuming electrical power from the power supply 5 in order to maintain the electrical device 4 in a standby mode awaiting activation, thereby substantially reducing the standby power consumed by the electrical device 4. It will be appreciated that factors such as current leaks may not be eliminated. Additionally, due to the use of the radio frequency signal 6, there is no need for the remote control device 3 to have a line of sight with the switching apparatus 2.

Figure 2:
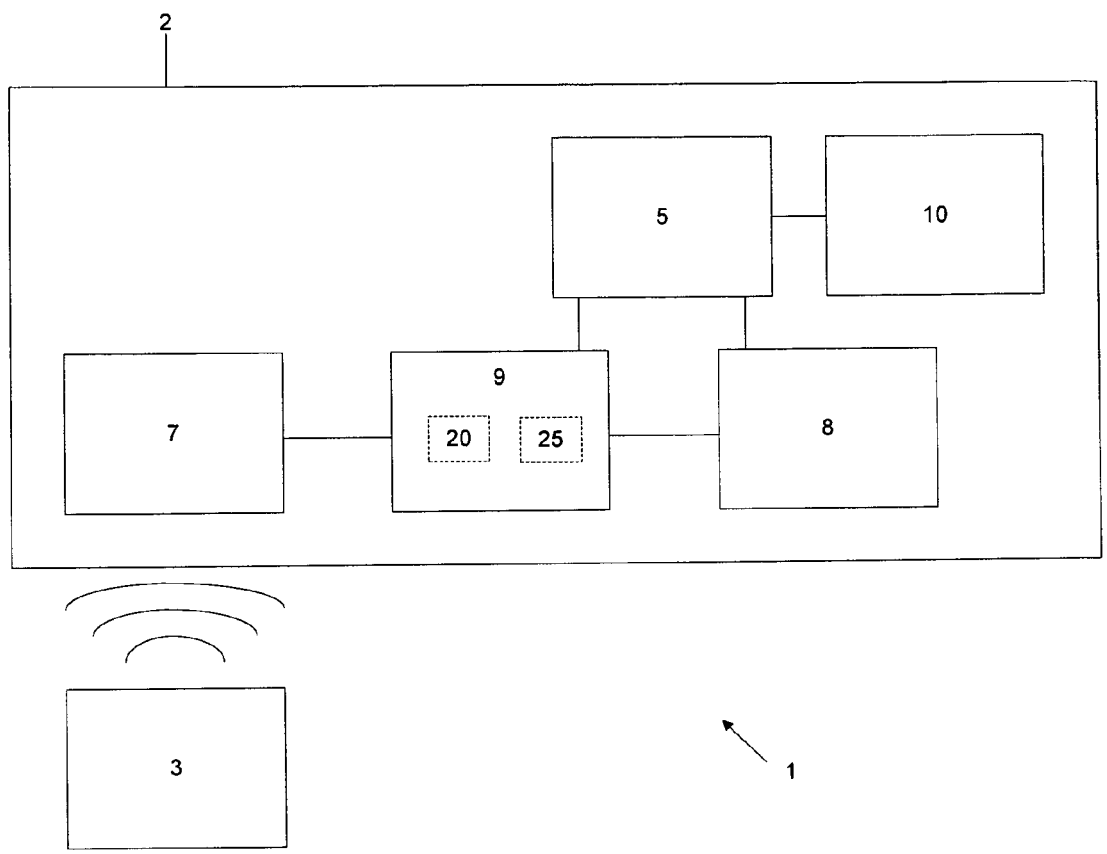
FIG. 2 illustrates a block diagram representing an example of the switching apparatus.

Referring to FIG. 2, there is shown a more detailed block diagram of the switching system 1.

In particular, the switching apparatus 2 of the switching system 1 comprises the passive radio frequency receiver 7, a control module 9 and a main switching module 8. The control module 9 and the main switching module 8 are in electrical communication with the power supply 5 and a mains input 10 of electrical power. The main switching module 8 can be in electrical communication with a plurality of electrical devices 4, such as a television, a computer monitor, and a Hi-Fi. The main switching module 8 comprises a plurality of switches for allowing and restricting consumption of power to a respective one of the electrical devices 4.

The remote control device 3 can be configured to emit a radio frequency signal 6 having a frequency within an unregistered band of the radio spectrum for the particular area which the switching system is being used.

The passive radio frequency receiver 7 comprises an antenna for receiving the emitted radio frequency signal 6. The antenna induces an electrical current in response to receiving the radio frequency signal 6. The generated electrical current is then used to power the control module 9 for controlling the main switching module 8.

The control module 9 can be a form of a decoder or demodulator which decodes the radio frequency signal to determine which switch is to be actuated. The radio frequency signal 6 can be a modulated radio frequency signal which is indicative of data. The data of the radio frequency signal 6 can be indicative of a code indicating a particular switch to actuate or a function to perform. The control module 9 uses the decoded signal to actuate the appropriate switch of the main switch module 8. Once the switch is actuated, power is provided to the particular electrical device 4 indicated by the radio frequency signal.

In one form, the control module 9 is configured to actuate the respective switch to the opposing mode. For example, if a switch is in the inactive mode and the switch is to be actuated, the switch is actuated to the inactive mode. Alternatively, if the switch is in the active mode, and the switch is to be actuated, the switch is then actuated to the inactive mode.

In another form, the radio frequency signal 6 may alternatively be indicative of the mode which the switch is to be actuated thereto. Therefore, in some instances, if the respective switch is already in the indicated mode, the switch is not actuated.

In another alternate form, the control module 9 may comprise memory, preferably non-volatile memory to reduce power consumption, to store the current mode of respective switches of the main switching module 8. In particular, the control module 9 retrieves the current switch state stored in the non-volatile memory prior to actuating the respective switch to the inactive or active mode. Additionally, after actuating the respective switch, the current state for the respective switch is updated.

In another alternative implementation, the remote control device 3 may emit various radio frequency signals 6, wherein each radio frequency signal 6 is unique with respect to the other radio frequency signals 6 emitted by the remote control device 3. The switching apparatus 2 may comprise a plurality of passive radio frequency receivers 7 each associated with one of the plurality of switches. Each passive radio frequency receiver 7 is configured to be responsive to one, and only one, of the plurality of radio frequencies emitted by the remote control device 3 in order to actuate the associated switch. In this manner, the radio frequency signal 3 does not require decoding in order to determine the particular switch to actuate.

In some instances, background radio frequency signals may be received by the switching apparatus 2 which could unintentionally actuate one or more switches of the switching apparatus 2. Therefore, in an optional form, the switching apparatus 2 may comprise a filter module 20 to filter unintended radio frequency signals, as shown by phantom lines in FIG. 2. In one form, each radio frequency signal 6 emitted by the remote control device may comprise a header signal wherein a number of radio frequency pulses are emitted for a predefined period of time to indicate that an signal has been emitted which is intended for the switching apparatus.

For example, the radio frequency signal 6 may comprise a header having pulses which have varying pulse lengths separated by a fixed period. The length of the captured pulses is then compared to a stored predefined code in the filter module 20 and in the event that the header corresponds to the predefined code, the radio frequency signal 6 is considered intended for the switching apparatus 2. Otherwise, the radio frequency signal 6 is considered to be background noise and thus is not used for actuating one of the switches. The filter module may be a sub-module of the control module 9.

In an alternative implementation, the radio frequency signal 6 may be indicative of a unique identity. The unique identity may again be transferred as a header of the emitted radio frequency signal 6. Therefore, the filter module 20 can be configured to demodulate the radio frequency signal 6 to determine the unique identity and then compare the demodulated unique identity to a stored predefined identity. If the demodulated unique identity corresponds to the stored predefined identity, the control module 9 uses the radio frequency signal 6 to determine the switch to be actuated. However, in the event that the demodulated unique identity does not match the predefined unique identity, then the switching apparatus 2 ignores the received signal.

It will be appreciated that each switching system 1 may comprise a unique predefined code or identity in order to alleviate a remote control device 3 controlling a different switching apparatus 2. The code or identity may be transferred as part of the signal. Upon demodulation by the filter module, the predefined code or identity which is part of the demodulated signal is compared to a predefined code or identity stored in the switching apparatus so as to determine whether the signal is intended for one of the switches.

Each switch of the switching module 8 may be a semiconductor device. In one form, the switch is a TRIAC. In another form, the switch is electro-mechanical switch such as a relay switch.

The switching apparatus 2 may be substantially housed with a housing which is receivable within at least one of: a general power outlet; a power distribution board; a portion of the electrical device.

In one variation, the switching apparatus can comprise a timer unit 25, as shown by phantom lines in FIG. 2. Upon receipt of a signal which causes actuation of one or more switches, the timer unit 25 may be initially actuated to cause the one or more switches to be actuated upon a period of time elapsing. For example, the signal received from the remote control device 3 may indicate that a specific switch is to be actuated after 30 minutes has elapsed. The timer unit 25 commences monitoring the elapsed time until the indicated switch can be actuated. The timer unit 25 may restrict actuation of one or more switches of the switching apparatus 2.

The timer unit 25 can also be configured to restrict actuation of the switch for particular time periods. For example, a signal may be received from the remote control device 3 indicating that a specific switch is to be restricted from actuation for 4 hours. Upon receipt of the signal, the timer unit monitors the elapsed time prior to allowing actuation of the specific switch. If a radio signal is received within this period of time, the timer unit restricts the switch from being actuated. It will be appreciated that this functionality may be appropriate in applications where a device connected to the specific switch is not be turned off for a certain period of time, or in circumstances where a device connected to the specific switch is not to be turned on for a certain period of time, for example parental control of children viewing television.

The timer unit 25 may be configured via the remote control to restrict actuation at regular intervals or for a schedule of time periods. For example, the timer unit 25 may be configured to restrict actuation of a specific switch every day between 9:00 am to 5:00 pm.

Figure 3:
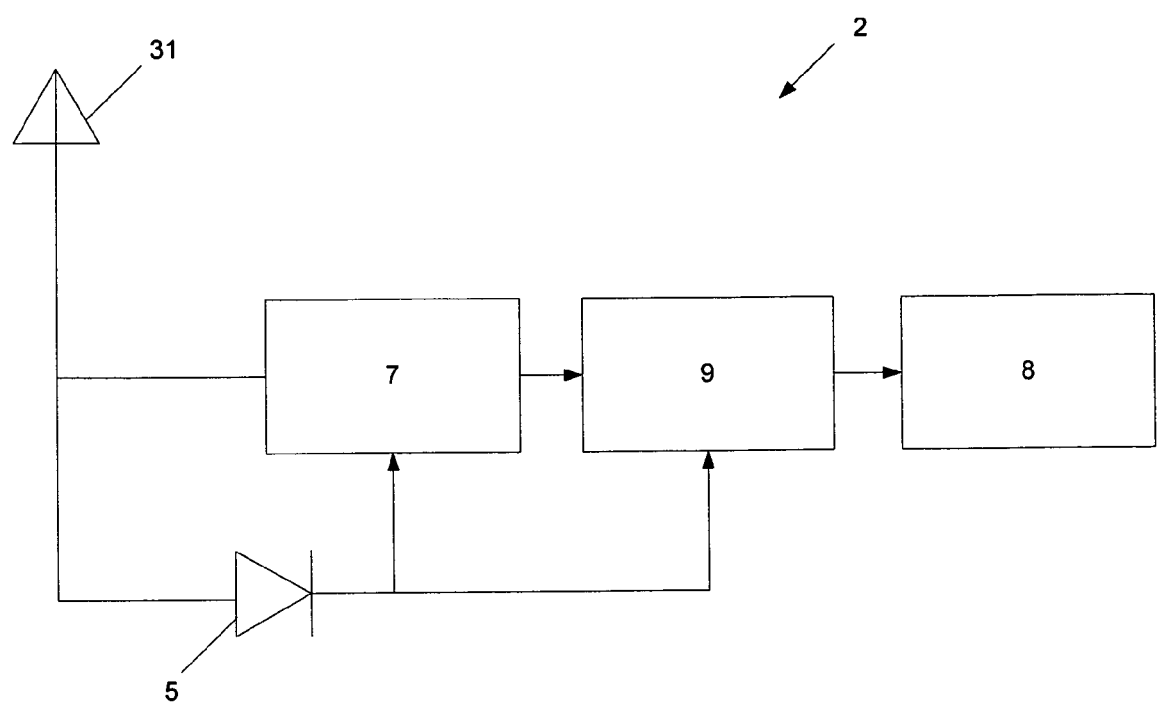
FIG. 3 illustrates a block diagram representing an example of the switching apparatus.

Referring to FIG. 3 there is shown a further block diagram of an example of the switching apparatus 2.

In particular, an antenna 31 receives the radio frequency signal 3, which can be any frequency in an unassigned frequency band. The radio frequency signal can be demodulated by a passive receiver module 7 and supplied to a logic and storage circuit 9. The logic circuit can decode the received signal and perform any error correction if required. The output from the logic and storage circuit 9 is a control signal that controls the power switch module 8. When activated, current can flow through the designated switch. The switching apparatus 2 may operate as a transceiver to receive the radio frequency signal from the remote control device 3, or alternatively the switching apparatus 2 may operate as transceiver.

Figure 4:
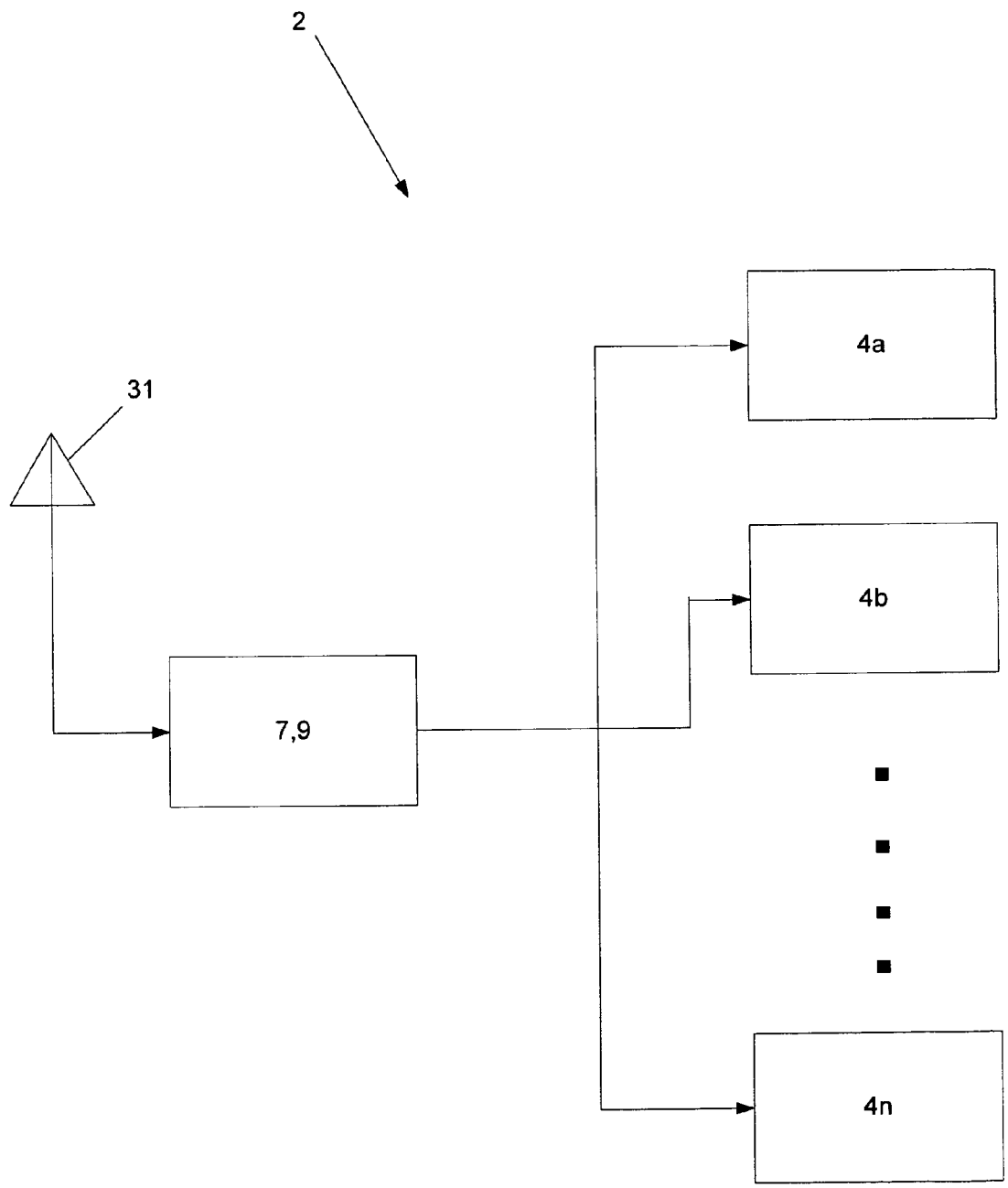
FIG. 4 illustrates a block diagram representing an example of the switching apparatus configured to operate multiple switches.

The receiver module 7 of the switching apparatus 2 may be an RF amplifier or an RFID tag circuit that is modified to meet the switching requirements. In particular, the RFID tag may be modified such that the transmitter is eliminated or inhibited in the event that no feedback is required Referring to FIG. 4 there is shown a block diagram of the switching apparatus 2 which is configured to operate multiple switches 4a, 4b, 4n. The switching apparatus can be used to control multiple power switches, as may be the case with a power board with multiple outlets. The total power may not exceed the specification of the wiring rules. In Australia a GPO (mains power socket, i.e. General Purpose Outlet) may not exceed 10 amps. The multiple switches can be controlled with one receiver and logic control unit. The received signal from the remote control handset encodes the switch positions. The logic circuit 9 decodes this signal and selects the appropriate switch which is to be actuated.

Figure 5:
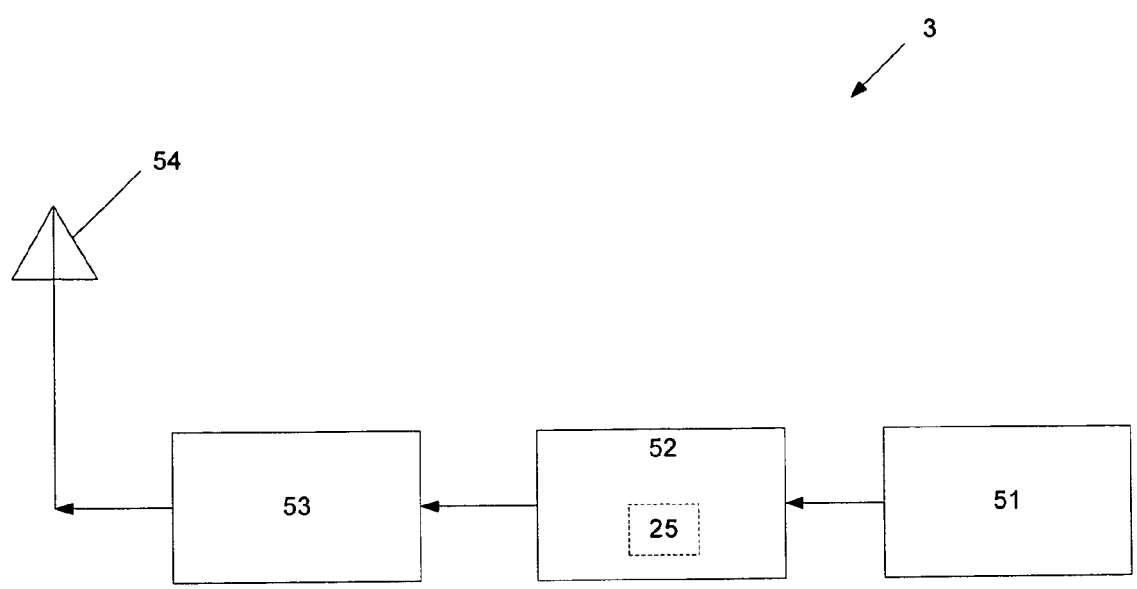
FIG. 5 illustrates a block diagram representing an example of the remote control device.

Referring to FIG. 5 there is shown a block diagram of the remote control device 3. The remote control device 3 can be configured similarly to an Infra Red remote control device. However, the signal 6 is transferred using the radio frequency spectrum rather than the infra red spectrum.

The remote control device 3 comprises a logic module 52 which can be configured to encode the signal to be indicative of a data representing a function selected by the user using an input interface 51 such as a keypad which is provided with the remote control device 3. The function may be indicative of whether a particular switch is to be actuated to an active or inactive mode. In some forms the function may be indicative of a user's selection to actuate the timer unit 25, wherein the function may indicate the amount of time to elapse prior to the switch being actuated. The logic circuit 52 passes the signal to the radio frequency transmitter 53 which is configured to modulate the signal for transfer. The signal is emitted via an antenna 54.

In one variation, the timer unit 25 may be provided in the remote control device 3 rather than the switching apparatus 2, as shown by phantom line is FIG. 5. In this variation, the user would select the timer function 25 using the keypad interface 51 of the remote control 3. The timer unit 25 would then monitor the time elapsed for a selected period of time until the radio frequency signal 6 would be transmitted to the switching apparatus 2.

Figure 6:
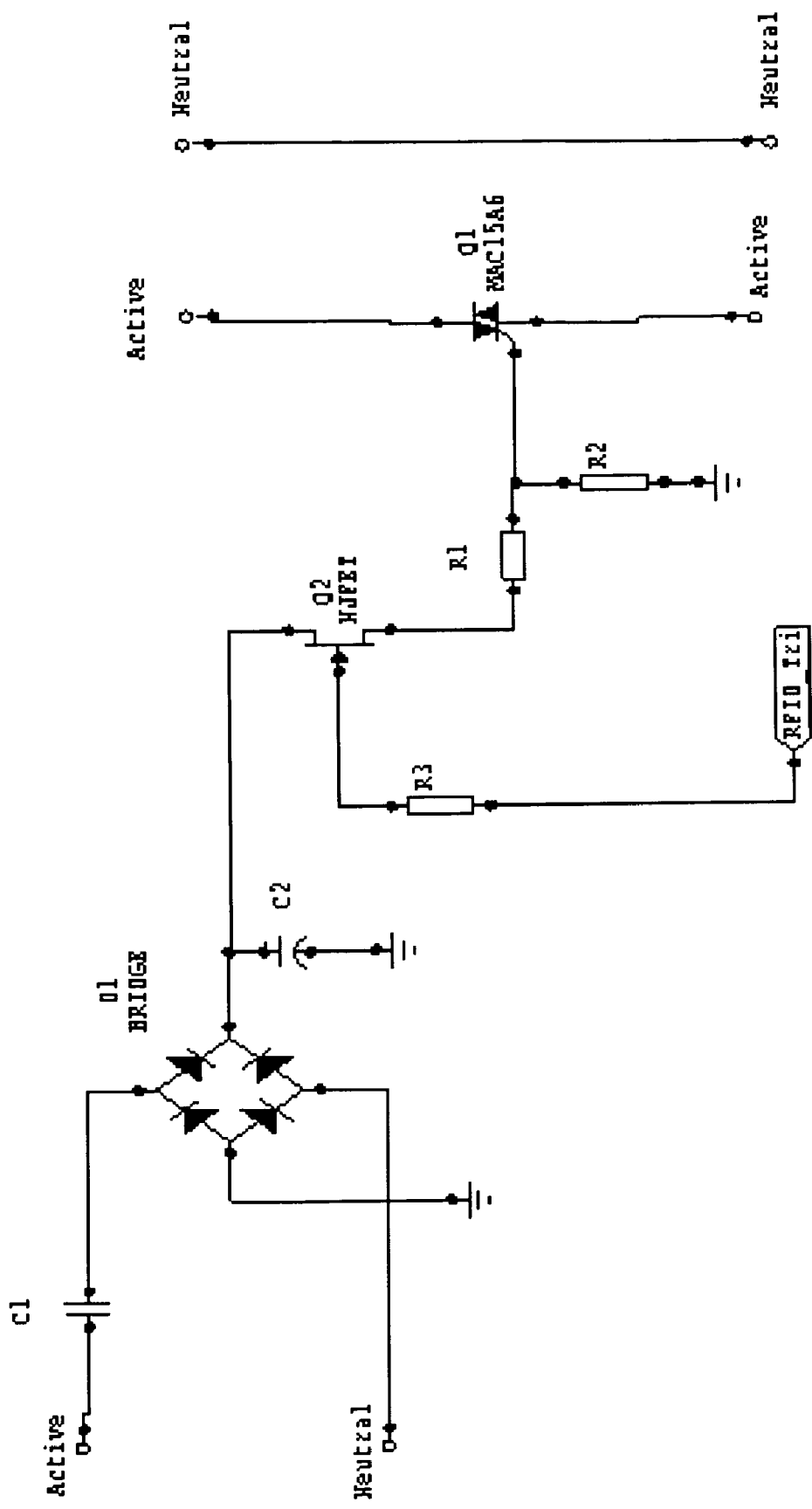
FIG. 6 illustrates an example schematic of a circuit diagram for the switching apparatus, excluding the Radio Frequency circuit.

Referring to FIG. 6 there is shown an example schematic of a circuit diagram for the switching apparatus.

In particular, the mains active is switched on and off with a triac $Q_1$. The triac $Q_1$ can be replaced with a relay or other switching device that is suitable to handle the switching source. Apart from handling an alternating voltage, direct voltage may also be controlled with this circuit provided a suitable switching device is used. A switch may also be placed in the neutral line, if required for safety or any other reason.

The gate of the triac $Q_1$ is switched on or off via a junction field effect transistor $Q_2$. A field effect transistor provides the advantage of high input impedance to the logic output from the RF control circuit. $R_1$ and $R_2$ are bias resistors for the gate circuit and they also serve as current limiters.

The voltage to drive the triac gate $Q_2$ is derived from rectifier $D_1$ and filter capacitor $C_2$. The mains voltage is stepped down via $C_1$, which acts as a low loss impedance. When the triac is switched off, apart from leakage currents, substantially no energy is consumed. For practical purposes, in the triac off state, virtually no power is drawn.

In one form, the logic circuit may interface with an inter-integrated chip ($I^2C$) bus in particular products such as a television receiver in order to interact with the control system of the television.

It will be appreciated that the switching apparatus 2 may be used in home automation. The switching apparatus may be used when some form of home equipment requires to be turned on or off. For example, the switching apparatus may interface using a wireless data transfer protocol such as ZigBee made available by the ZigBee Organisation (www.zigbee.org) or an internet application. Such an application may be interfaced with to the remote control device or a power switch driver.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The invention claimed is:

1. A switching system for reducing standby power consumed by an electrical device, the switching system comprising:
    a remote control device configured to selectively emit a radio frequency signal;
    a switching apparatus configured to be in electrical communication with a power supply and the electrical device, wherein the switching apparatus includes,
        a passive radio frequency receiver configured to receive the emitted radio frequency signal, the passive radio frequency receiver configured to convert the received radio frequency signal into electrical power; and
        a switch actuable, in response to the electrical power generated by the passive radio frequency receiver, from an inactive mode, wherein the switch is configured to restrict the electrical device consuming standby power from the power supply,
        to an active mode, wherein the switch is configured to allow the electrical device to consume power from the power supply, and
        in response to receiving the radio frequency signal, the switch is configured to be actuated to the inactive mode if the switch is in the active mode.

2. The switching system according to claim 1, wherein the switching apparatus is configured to be in electrical communication with a plurality of electrical devices and the switching apparatus comprises a plurality of switches, and
    if the remote control device emits the radio frequency signal, one of the plurality of switches is actuated from the inactive mode to the active mode to provide power to one of the plurality of electrical devices.

3. The switching system according to claim 2, wherein the radio frequency signal emitted by the remote control device is indicative of one of the plurality of the switches to be actuated, and
    the switching apparatus comprises a decoding circuit configured to decode the received radio frequency signal to determine and actuate the indicated one of the plurality of the switches.

4. The switching system according to claim 2, wherein the remote control device is configured to emit a plurality of radio frequency signals, each radio frequency signal having a unique frequency, and
    the switching apparatus comprises a plurality of passive radio frequency receivers, wherein each passive radio frequency receiver is responsive to a respective frequency in order to actuate the associated switch.

5. The switching system according to claim 2, wherein the switching apparatus comprises a memory configured to store a current state of the plurality of switches, the current state is retrieved from the memory prior to actuating the respective switch to the inactive or active mode, and after actuating the respective switch, updating the current state for the respective switch.

6. The switching system according to claim 1, wherein the switch is a semiconductor device.

7. The switching system according to claim 6, wherein the switch is a triode alternating current switch (TRIAC).

8. The switching system according to claim 6, wherein the switch is an electro-mechanical switch.

9. The switching system according to claim 8, wherein the electromechanical switch is a relay switch.

10. The switching system according to claim 1, wherein the switching apparatus has a housing which is receivable within at least one of:
    a general power outlet (GPO);
    a power distribution board; and
    a portion of the electrical device.

11. The switching system according to claim 1, wherein the switching apparatus comprises:
    a filter circuit configured to filter received radio frequency signals unintended for the switching system, and compare a decoded radio frequency signal of a received radio frequency signal against a predefined code to determine whether the received radio frequency signal is intended for the switching system.

12. The switching system according to claim 1, wherein the switching apparatus comprises:
    a timer unit configured to be in electrical communication with the passive radio frequency receiver and the switch, wherein the timer unit is actuable upon receipt of an electrical signal received by the passive radio frequency receiver from the remote control device such that actuation of the timer unit restricts actuation of the switch for a period of time.

13. The switching system according to claim 12, wherein the remote control device comprises:
    a keypad configured to select the period of time for the timer unit to restrict actuation of the switch, wherein the emitted radio frequency signal is indicative of the period of time for the timer unit to restrict actuation of the switching apparatus.

* * * * *